Nov. 18, 1930.  J. BEREZOWSKI  1,781,997
CLAMP
Filed Oct. 23, 1929
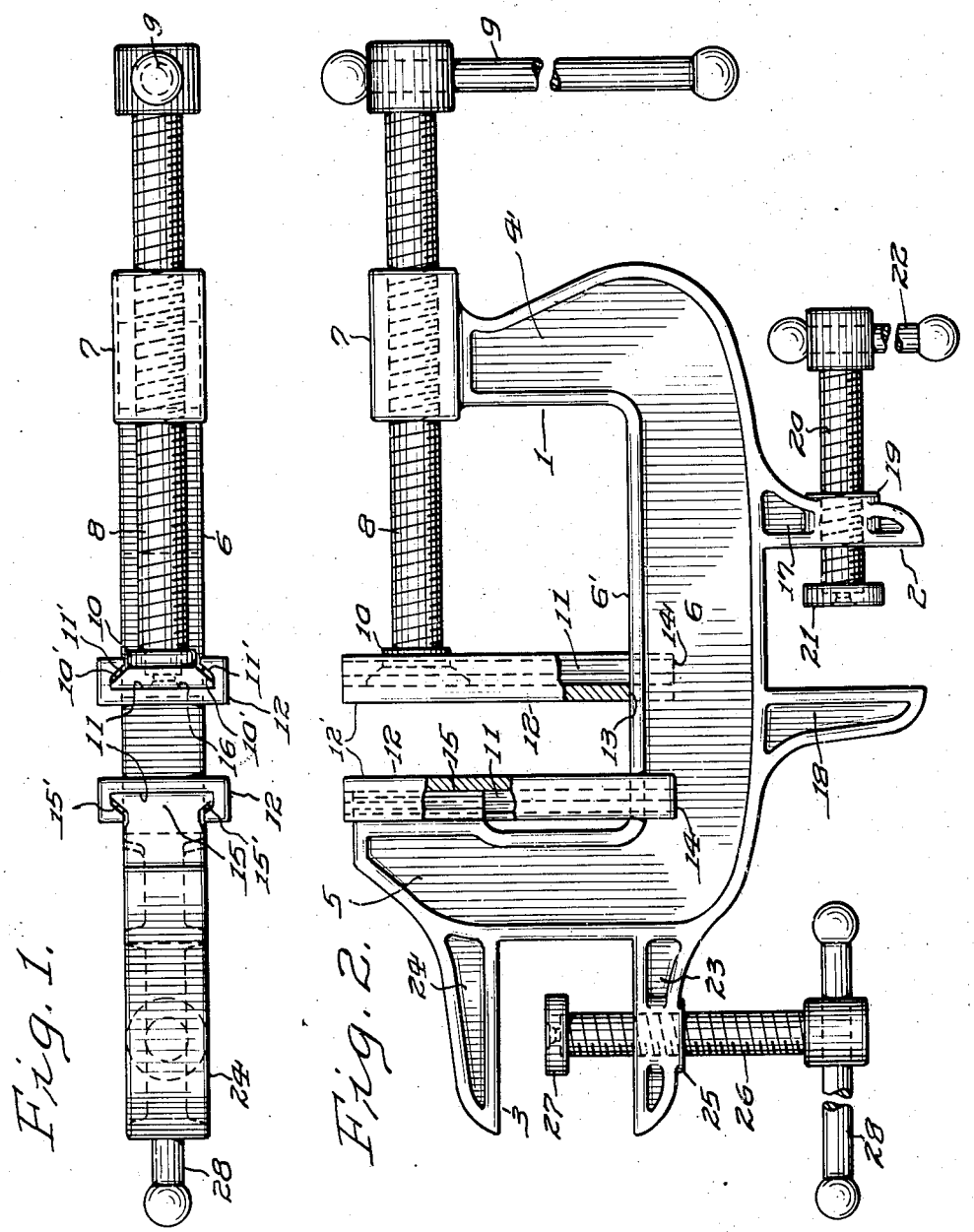
INVENTOR
John Berezowski.
WITNESS
BY
ATTORNEY Patented Nov. 18, 1930

1,781,997

UNITED STATES PATENT OFFICE

JOHN BEREZOWSKI, OF PHILADELPHIA, PENNSYLVANIA, ASSIGNOR OF ONE-HALF TO PETER BEREZOWSKI, OF PHILADELPHIA, PENNSYLVANIA

CLAMP

Application filed October 23, 1929. Serial No. 401,732.

This invention relates to clamps and more particularly to clamps of the C-type, having two rigid jaws and a screw, threaded through one jaw and movable longitudinally toward and away from the other jaw to clamp between said other jaw and the end of the screw the article to be held therein or thereby.

It is one of the objects of the present invention to provide such a C-clamp with a plurality of similar auxiliary clamping devices arranged around the body of the main C-clamp and having jaws protruding at three different directions with respect to each other so that three different pieces of work or parts of a structure, coming to the clamp from three different directions, may be simultaneously held in a rigid relationship in the single device, for the purpose of permitting work to be done on any or all of them, or for holding them in a definite position with respect to each other, e. g., as in assembling or repairing the top or body of a motor vehicle.

The clamp forming the subject-matter of this application has been particularly adapted to and used in connection with the assembling and repairing of automobile bodies and tops wherein relatively long pieces or parts have to be held rigidly together in a fixed and substantially assembled relationship in constructing or repairing or making the body or top, and the device has been designed with that purpose or function in view, but the invention is not to be construed as limited thereto for its utility will be apparent to those who are familiar with the assembly of various structures of three dimensions wherein the parts have to be clamped while work is being done upon them and where the clamp has to be taken to the work and placed thereon, in contradistinction to that type of work wherein a vise would be conveniently mounted in a fixed position and arranged to hold work brought to it and clamped within its jaws.

With these considerations in mind, the present invention then has for its object the construction of a three-dimensional clamp comprising a main or two relatively large C-clamps with relatively smaller similar clamps integral therewith and extending outwardly from the back of the clamp and outwardly from the jaw of the main clamp toward and away from which the main clamping screw is propelled and extending at right angles to the jaws of the other smaller clamp.

Other objects of my invention will appear in the specification and claims below.

Referring to the drawings forming a part of the specification and in which the same reference characters are employed in the different views to designate the same part, Fig. 1 is a top plan view of the preferred embodiment of my improved clamping device; and Fig. 2 is a side elevational view of the same.

My tri-dimensional clamping device comprises in combination a main generally C-shaped clamp 1 and two similar auxiliary clamps 2 and 3 respectively. The main clamp 1 comprises a pair of main stationary jaws 4 and 5 respectively connected together integrally with the connecting portion 6 of the frame. The stationary main jaw 4 is preferably provided with a rectangular end 7 through which is threaded a clamping screw 8 which moves or travels longitudinally through the squared end 7 on its screwthreads and moves longitudinally bodily toward and away from the other clamping jaw 5. The outer end of the screw 8 is preferably provided with a lever or handle 9 for rotating the screw 8 and the inner end of the said screw is preferably provided with a head 10 preferably rectangular in shape and having beveled sides 10' to slidingly fit within a slot 11 in the back of a facing or follower 12, the vertical sides 11' of said slot 11 being undercut to fit on the opposite sides 10'' of the head 10.

This facing or follower 12 is preferably long enough to rest at its lower end on the inner edge 6' of the connecting portion 6 when the follower 12 is slipped over the head 10, as shown in the drawings.

The bottom edge of the follower or facing 12 is provided with a notch 13 forming legs or shoulders 14 to loosely fit against the opposite sides of the inner edge 6' so that as the screw 8 is rotated and the head 10 is moved toward or away from the clamping jaw 5, the follower or facing 12 will travel with the head 10 sliding over the surface 6' between the jaws.

The jaw 5 is also preferably provided with a stationary head 15, the vertical sides 15' of which are beveled outwardly away from the jaw 5 to slidingly fit within the slot 11 of a second facing 12 provided with a notch 13 and legs 14 to also straddle the inner edge 6' of the connecting portion 6 of the main clamp 1. The head 10 on the inner end of the screw 8 is freely rotatable on the end of the screw 8, being held in position by a rivet 16 preferably integral with the end of the screw 8.

Projecting from the back of the connecting portion 3 is the auxiliary clamp 2 comprising a pair of auxiliary jaws 17, 18 extending substantially parallel to each other and to the jaws 4 and 5 but projecting in an opposite direction to that of the jaws 4 and 5. The jaw 17 is provided with an enlargement 19 through which a clamping screw 20 is threaded, said screw 20 having a rotatable head 21 on its inner end and a lever or handle 22 on its outer end. This auxiliary clamp 2 is of the C-clamp type but the connecting portion thereof with which the auxiliary jaws 17, 18 are integral, is the connecting portion 6 of the main clamp 1. The intermediate portion of the connecting member 6 forms the connecting portion of both clamps 1 and 2.

On the jaw 5 of the main clamp 1 is the second auxiliary clamping device 3 similar to the first auxiliary clamp 2 above described, but the clamping jaws 23 and 24 extend in a direction at right angles to that in which the jaws of the main clamp 1 and the jaws of the first auxiliary clamp 2 extend. These two auxiliary jaws 23, 24 are substantially parallel to the axis of the screw 8. The jaw 23 is preferably provided with a screwthreaded enlargement 25 within which fits the clamping screw 26, the inner end of which is preferably provided with a rotatable head 27 between which and the jaw 24 the work is held.

The outer end of the screw 26 is preferably provided with a turning bar or handle 28. This second auxiliary clamp 3 is also substantially of the C-type but the connecting portion for the two jaws 23 and 24 with which said jaws are integral is the main jaw 5 of the main clamp 1.

The main jaw 5 forms the connecting portion of the second auxiliary clamp 3.

The facings 12 which are adapted to interchangeably fit to slide vertically over the stationary head 15 and the square rotatable head 10 on the screw 8 are preferably provided with plane smooth faces 12' and are preferably made of copper or aluminum or soft metal so that the clamp may be firmly secured against surfaces which are easily marred, and without injury thereto.

While in the drawings I have shown these facings 12 as but a little wider than the heads 10 and 15, they may be of any greater width to distribute the pressure on the object held between them over a relatively large surface, thus holding the object securely without clamping is so tightly as to injure the surface thereof. When not needed, the facings 12 are readily removed by lifting them upwardly, sliding them over the heads which fit into the keyed or undercut slot 11 in the back sides thereof.

The squared end 7 of the main jaw 4 provides flat rectangular surfaces 7' on three sides thereof upon which work may be rested and supported for light hammering when the main clamp 1 is clamped to the work in almost any position except when the auxiliary clamp 2 is so positioned over the main clamp 1. It forms a light anvil conveniently positioned on the clamp.

It will now be seen that I have provided a tri-directional or tri-dimensional clamp in which the jaws extend in three different directions outwardly from the clamp. Thus referring to Fig. 2 the main clamp may hold a bar or strip at any angle of the 360° in a vertical plane; the auxiliary clamp 2 is also capable of holding a rod or strip at any angle of the 360° in a vertical plane parallel to the vertical plane of the main clamp 1; and the auxiliary clamp 3 is adapted to hold a rod or strip at any angle of the 360° of a horizontal plane. This makes the clamp practically universal or tri-dimensional and adapts it for securing together parts which go to the three dimensions, namely, the height, length and breadth of the structure being held therein.

Having thus described my invention, what I claim and desire to protect by Letters Patent of the United States is:

1. A tri-dimensional clamping device comprising the combination with a main generally C-shaped clamp consisting of two main stationary jaws, a connecting portion integral therewith and a clamping screw, threaded through one main jaw and longitudinally movable toward and away from the other main jaw, of an auxiliary clamp comprising two substantially parallel auxiliary jaws and a connecting portion integral therewith and comprising said main connecting portion of said main clamp, said auxiliary jaws extending in a direction opposite to that in which said main jaws extend, a clamping screw through one of said auxiliary jaws movable longitudinally toward and away from the other of said auxiliary jaws, and a second auxiliary clamp also comprising two substantially parallel stationary jaws and a connecting portion integral therewith, said connecting portion being that main jaw toward and away from which said main clamping screw moves longitudinally, said second auxiliary clamping jaws projecting outwardly from said main jaw in a direction at right angles to that in which said main and first auxiliary jaws extend and a clamping screw threaded through one of said second auxiliary jaws and movable longitudinally toward and away from the other of said second auxiliary jaws.

2. A clamping device comprising the combination with a main generally C-shaped clamp consisting of two main stationary jaws, a connecting portion integral therewith, a clamping screw, threaded through one of said main jaws and longitudinally movable toward and away from the other main jaw, the inner end of said screw being provided with a head having beveled sides diverging outwardly from the end of said screw, said other main jaw having a stationary head having vertical side walls flaring outwardly from said jaw and a facing plate having a plain smooth front face and a groove in the back thereof extending substantially the height of said plate and provided with undercut side edges adapted to slide over and loosely fit alternately the side walls of said heads to straddle said connecting portion, and to slide on said connecting portion with said screw when fitted over the head on said screw.

3. A tri-dimensional clamping device comprising the combination with a main, generally C-shaped clamp providing a main frame having two main stationary jaws and a connecting portion rigid therewith and a clamping screw, threaded through one main jaw and longitudinally movable toward and away from the other main jaw, of two auxiliary clamps, each comprising two substantially parallel auxiliary jaws and a connecting portion integral therewith and comprising a portion of said main frame, the jaws of each auxiliary clamp extending parallel to each other and outwardly in the plane of said main clamp and outwardly from the back of said frame, a clamping screw for each of said auxiliary clamps respectively, said clamping screw being threaded through one of the auxiliary jaws of the pair of jaws, and movable longitudinally toward and away from the other of said pair of auxiliary jaws, the jaws of one of said auxiliary clamp extending in a direction to make a substantial angle with the jaws of the other auxiliary clamp.

In witness whereof, I have hereunto set my hand this 22nd day of October, 1929.

JOHN BEREZOWSKI.